(No Model.)
J. MACDONALD.
HYDROSTATIC LEVELING INSTRUMENT.
No. 259,408. Patented June 13, 1882.
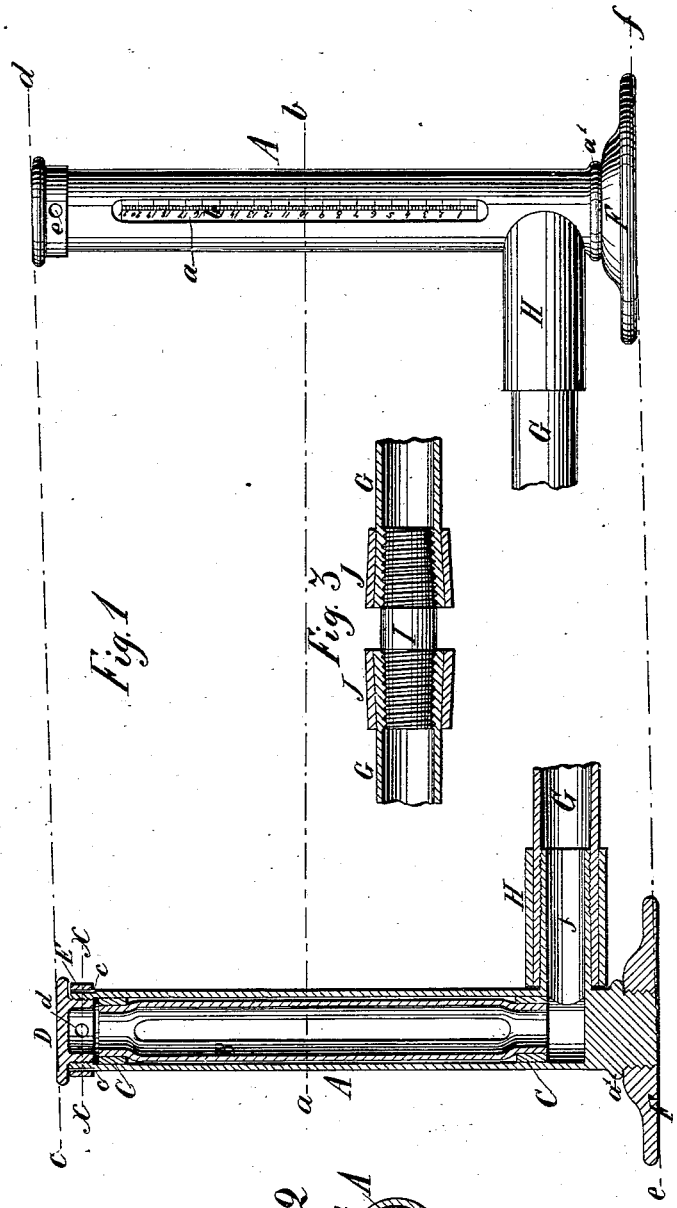
Witnesses:
O. F. Malmberg
Thor Lundblad
Inventor:
James Macdonald
by A. W. Almqvist
Attorney.

UNITED STATES PATENT OFFICE.

JAMES MACDONALD, OF WOODSIDE, NEW YORK.

HYDROSTATIC LEVELING-INSTRUMENT.

SPECIFICATION forming part of Letters Patent No. 259,408, dated June 13, 1882.

Application filed February 16, 1882. (No model.)

*To all whom it may concern:*

Be it known that I, JAMES MACDONALD, a citizen of the Dominion of Canada, and a resident of Woodside, in the county of Queens and State of New York, have invented a new and useful Improved Leveling-Instrument, of which the following is a specification.

My invention relates to instruments for leveling long reaches of shafting, and, in general, to ascertain the deviation, if any, in altitude, from the same horizontal plane, of any two points situated at such a distance apart as to preclude the use of an ordinary level.

The invention consists in the construction and combination, with a flexible pipe, of two liquid-containing graduated portable standards, and, in combination with the same, of peculiarly-constructed coupling devices, as hereinafter described and claimed.

In the accompanying drawings, Figure 1 represents the two standards of the instrument in position for use, the flexible connecting-pipe being broken off and one of the standards being shown in vertical section. Fig. 2 is a detail horizontal section through the line *x x* of Fig. 1; and Fig. 3 is a longitudinal sectional detail, showing the means of connecting additional lengths of hose.

Like letters of reference indicate like parts.

The outer shell of each standard A consists of a tube of brass or other metal, closed at its lower and open at its upper end, and provided at opposite sides with vertical slots *a*, through which the difference of an object in altitude above or below the horizontal line indicated by the surface of the contained liquid is visible on a graduated scale, *b*, marked on the said tube at the edge of one of said slots, or, preferably, upon a glass tube, B, fitted within the tube A. The diameter of the glass tube B is contracted for a distance at its two open ends to afford room for a rubber ring or packing, C, which surrounds the so reduced ends of the tube, and is interposed between the same and the inner circumference of the tube A to form an air and water tight packing between the two tubes. Above the glass tube B the end of the tube A is threaded on the inside, and a tubular cap, D, milled on the circumference of its head, is threaded to screw tightly into the tube A in the said threaded end of the tube A. When thus screwed together the tube A and tubular part of the cap D are bored through simultaneously on one side to form a small vent, *d*. A ring or band, E, surrounds the perforated end of the tube A, fitting tightly in a rabbet, *c*, on the outer circumference of the said tube, and has a corresponding perforation, *e*, which, when the band E is turned with the hole *e* opposite the hole *d*, will admit air into the upper end of the standard, or into the standard above the liquid surface, and when turned in any other position will act as a valve to close the opening *d* to prevent the within liquid from escaping through the said hole during the transportation of the instrument. The lower end of the tube A is threaded on the outside up to a stop or shoulder, *a'*, and a foot, F, whose under surface is exactly at right angles to the axis of the standard, has a threaded central opening, allowing it to be screwed up tightly against the shoulder *a'*, and when thus screwed is adapted to support the tube A at always the same altitude relative to the base-surface of the foot F. Below the glass tube B the metal tube A has a lateral tubular projection, *f*, threaded or grooved upon its outer circumference for the reception of the end of a flexible tube, G, preferably of rubber, into which the said projection *f* is entered to form a flexible tubular connection between the two standards for the retention of water or other suitable liquid. A sleeve, H, fitting tightly upon the rubber tube G, is pushed over that part of the latter which surrounds the projection *f*, thus forcing the inner surface of the flexible tube into the threads or grooves in the circumference of the tube *f*, thereby not only forming a water and air tight connection, but preventing the possibility of the tube G being accidentally disconnected from the tube *f*. When the distance between the standards A is so large as to make it necessary to lengthen the flexible tube by additional sections, this is accomplished by the device shown in Fig. 3. The adjacent ends of two rubber-tube sections are pushed over the outwardly threaded or grooved surfaces of the tapering ends of a metallic coupling-tube, I, and corresponding conical sleeves, J, surrounding the ends of the said flexible tubes, tighten the same against the grooved surface of the coupling-tube in a manner similar to that described of the sleeve H and tubular projection $f$.

To use the instrument, one of the caps, D, is removed and the ring-valve E of the other standard is turned so as to admit air through the openings $e$ and $d$. Water is then poured into the uncovered standard in quantities sufficient to fill the standards and the flexible connection between them just far enough to reach the middle or central divisions on the scales $b$, when the said divisions are in the same horizontal plane, (indicated by the line $a\ b$.) The removed cap D is then replaced and the ring-valves E closed. The instrument is now conveniently portable without spilling the liquid, and ready for use. To level two points at any distance apart where the standards can be supported by their feet F—as, for instance, two points upon the surface of an untrue shafting (indicated by the line $e\ f$)—it can evidently be done by one person by simply placing first the one standard and then the other in position and taking observation of the scales $b$. When, however, no surface is accessible whereon to support the standards—as, for instance, on the under side of an untrue shafting (as indicated by the line $c\ d$) whose upper side is too near the ceiling to admit of space for the standards—the scale is read downward from the upper surface of the caps D, and two persons will be needed at the same time to hold the two standards. For convenience' sake, the tubes B may therefore be provided with double scales $b$, read in opposite directions. When the standards are placed in position the ring-valves E should be turned to admit air through the holes $e$ and $d$ for equalizing the pressure on the two ends of the liquid column, and thus allow the liquid to find its level.

It is evident that this apparatus is easily portable and occupies very little room when packed or stowed away, particularly as the feet F may be unscrewed from the tubes A, and that by it any two points at any distance apart may be leveled, regardless of any protuberances that may intervene between the two points to be leveled. Even the altitude relative to the same horizontal plane of two points in entirely different buildings may easily be ascertained.

Having thus described my invention, I claim as new and desire to secure by Letters Patent—

1. A leveling-instrument consisting of the combination, with the flexible tube G, of standards formed of tubes A, capped at their upper end and provided with the foot-plate F, and the lateral tubular projection $f$, substantially as and for the purpose set forth.

2. In a leveling-instrument, the standard formed of the combination of the tube A, having the tubular side projection, $f$, the glass tube B, contracted at its ends and provided with the packing C, the perforated cap D, and the ring-valve E, provided with the perforation $e$, substantially as and for the purpose set forth.

3. In the standard of a leveling-instrument, the tube A, threaded outside at its lower end and inside at its upper end, and provided with a shoulder, $a'$, in combination with the detachable threaded foot-plate F and the screw-cap D, and adapted to apply above as well as below the points to be leveled, substantially as specified.

4. The tube A, having the lateral tubular projection $f$, grooved or threaded upon its outer surface, in combination with a flexible tube, G, and the exterior tightening-sleeve, H, as and for the purpose set forth.

5. In the standard of a leveling-instrument, the tube A, provided with the exterior circumferential rabbet, $c$, in combination with a milled and perforated tubular screw-cap, D, and the perforated ring-valve E, fitted in the said rabbet below the head of the said screw-cap, for the purpose of preventing leakage and admitting air from and to the interior of said standard, as set forth.

In testimony that I claim the foregoing as my invention I have signed my name, in presence of two witnesses, this 13th day of February, 1882.

JAS. MACDONALD.

Witnesses:
B. S. CLARK,
A. W. ALMQVIST.